US008339441B2

(12) United States Patent  (10) Patent No.: US 8,339,441 B2
Yamada  (45) Date of Patent: Dec. 25, 2012

(54) FRAME PROCESSING DEVICE, TELEVISION RECEIVING APPARATUS AND FRAME PROCESSING METHOD

(75) Inventor: Masahiro Yamada, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 766 days.

(21) Appl. No.: 12/480,323

(22) Filed: Jun. 8, 2009

(65) Prior Publication Data

US 2010/0165079 A1 Jul. 1, 2010

(30) Foreign Application Priority Data

Dec. 26, 2008 (JP) ................... P2008-335308

(51) Int. Cl.
    *H04N 13/00* (2006.01)
(52) U.S. Cl. .......................................... 348/43
(58) Field of Classification Search .............. 348/43
    See application file for complete search history.

(56) References Cited

U.S. PATENT DOCUMENTS

| 6,529,175 | B2* | 3/2003 | Tserkovnyuk et al. ........... 345/9 |
| 6,532,008 | B1* | 3/2003 | Guralnick .................... 345/419 |
| 7,197,074 | B2* | 3/2007 | Biswas et al. ............. 375/240.16 |
| 7,580,463 | B2 | 8/2009 | Routhier et al. |
| 7,693,221 | B2 | 4/2010 | Routhier et al. |
| 7,724,211 | B2 | 5/2010 | Slavenburg et al. |
| 7,844,001 | B2 | 11/2010 | Routhier et al. |
| 2006/0012676 | A1* | 1/2006 | Tomita ............................ 348/51 |
| 2007/0146541 | A1 | 6/2007 | Hirayama et al. |
| 2007/0229487 | A1 | 10/2007 | Slavenburg et al. |
| 2008/0085049 | A1* | 4/2008 | Naske et al. .................. 382/154 |
| 2008/0303962 | A1 | 12/2008 | Tomita et al. |
| 2009/0027549 | A1* | 1/2009 | Weisgerber .................... 348/441 |
| 2009/0115780 | A1* | 5/2009 | Varekamp et al. ............. 345/419 |
| 2009/0219382 | A1 | 9/2009 | Routhier et al. |
| 2009/0278918 | A1* | 11/2009 | Marcus et al. .................. 348/54 |
| 2010/0110304 | A1* | 5/2010 | Chen ............................ 348/701 |
| 2010/0201791 | A1 | 8/2010 | Slavenburg et al. |

(Continued)

FOREIGN PATENT DOCUMENTS

CA        2380105        10/2003

(Continued)

OTHER PUBLICATIONS

Japanese Office Action dated Jun. 28, 2011, filed in Japanese counterpart Application No. 2009-292028, 8 pages.

(Continued)

*Primary Examiner* — Larry Donaghue
(74) *Attorney, Agent, or Firm* — Patterson & Sheridan, LLP (57) ABSTRACT

A three-dimensional video is appropriately displayed. A frame processing device includes: a frame extraction module configured to sequentially extract image frames for left eye and for right eye from a three-dimensional video signal; a frame group generation module configured to alternately generate frame groups for left eye and for right eye based on the extracted image frames for left eye and for right eye; a frame storage module configured to sequentially store the alternately generated frame groups for left eye and for right eye; a video processing module configured to sequentially extract the image frames from the frame storage module, and sequentially rewriting a display screen; and a display invalidation module configured to invalidate the display on the display screen during periods of rewriting the image frame for left eye to that for right eye and the image frame for right eye to that for left eye.

8 Claims, 7 Drawing Sheets

U.S. PATENT DOCUMENTS

| | | | |
|---|---|---|---|
| 2010/0231696 | A1 | 9/2010 | Slavenburg et al. |
| 2011/0012904 | A1 | 1/2011 | Slavenburg et al. |

FOREIGN PATENT DOCUMENTS

| | | | |
|---|---|---|---|
| CA | 2481423 | | 10/2003 |
| CA | 2646439 | | 11/2007 |
| CN | 101320197 | | 12/2008 |
| CN | 101371292 | | 2/2009 |
| CN | 101982978 | | 3/2011 |
| EP | 1024672 | A1 | 2/2000 |
| EP | 1495642 | | 1/2005 |
| EP | 1804507 | | 7/2007 |
| EP | 2083574 | | 7/2009 |
| EP | 2211557 | | 7/2010 |
| EP | 2211558 | | 7/2010 |
| JP | 06-205446 | | 7/1994 |
| JP | A 07-075133 | | 3/1995 |
| JP | 07-284127 | | 10/1995 |
| JP | 09-051552 | | 2/1997 |
| JP | A 10-257525 | | 9/1998 |
| JP | A 10-257526 | | 9/1998 |
| JP | A 2004-040455 | | 2/2004 |
| JP | 2004-253879 | | 9/2004 |
| JP | 2005-157033 | | 6/2005 |
| JP | 2005-164916 | | 6/2005 |
| JP | 2005-522958 | | 7/2005 |
| JP | 2006-033363 | | 2/2006 |
| JP | 2007-110683 | | 4/2007 |
| JP | 2007-133418 | | 5/2007 |
| JP | 2007-180765 | | 7/2007 |
| JP | 2008-306335 | | 12/2008 |
| JP | 2009-232249 | | 10/2009 |
| KR | 2007-0098689 | | 10/2007 |
| KR | 2010-0117549 | | 11/2010 |
| WO | WO 95/13684 | | 5/1995 |
| WO | WO-2007/126904 | | 11/2007 |

OTHER PUBLICATIONS

Japanese Office Action dated Jan. 10, 2012, filed in Japanese counterpart Application No. 2009-292028, 8 pages (with English translation).

* cited by examiner

FRAME PROCESSING DEVICE, TELEVISION RECEIVING APPARATUS AND FRAME PROCESSING METHOD

CROSS-REFERENCE TO RELATED APPLICATIONS

This application is based upon and claims the benefit of priority from the prior Japanese Patent Application No. 2008-335308, filed on Dec. 26, 2008; the entire contents of which are incorporated herein by reference.

BACKGROUND OF THE INVENTION

1. Field of the Invention

The present invention relates to a frame processing device processing an image frame, a television receiving apparatus including the frame processing device, and a frame processing method.

2. Description of the Related Art

A television receiving apparatus is known which includes a display function for three-dimensional video. As the display mode to realize the three-dimensional video, various display modes are proposed. In one of them, images viewed by left and right eyes of a viewer are independently transmitted. Further, the image for left eye and the image for right eye are alternately displayed by a display device while changing the plane of polarization. Further, the viewer wears glasses which alternately switch the plane of polarization in cooperation with the display to view the independent images by the left and right eyes.

Here, a digital broadcast receiver is proposed which determines whether video data is the one corresponding to the three-dimensional broadcast or the one corresponding to an ordinary broadcast, and appropriately displays any of the video data on its monitor (refer to, for example, JP-A 10-257525 (KOKAI)).

Incidentally, to display the above-described three-dimensional video, it is important to alternately display the image for left eye and the image for right eye without mixing them. Here, generally, the previously displayed image is sequentially rewritten every scanning line from top to bottom of the screen in updating the image in a display device. Accordingly, for example, at the timing of scanning a middle portion of the screen, there is a display state in which the upper half of the display screen displays the image for right eye and the lower half displays the mage for left eye. When the viewer views this screen, the viewer recognizes an image without appearance of solidity.

BRIEF SUMMARY OF THE INVENTION

An object of the present invention is to provide a frame processing device, a television receiving apparatus and a frame processing method each capable of appropriately displaying three-dimensional video.

A frame processing device according to an aspect of the present invention includes: a frame extraction module configured to sequentially extract image frames for left eye and image frames for right eye from a three-dimensional video signal containing a video signal for left eye and a video signal for right eye; a frame group generation module configured to alternately generate a frame group for left eye in which a plurality of image frames for left eye are arranged and a frame group for right eye in which a plurality of image frames for right eye are arranged, based on the image frames for left eye and for right eye sequentially extracted by the frame extraction module; a frame storage module configured to sequentially store the frame group for left eye and frame group for right eye alternately generated by the frame group generation module; a display rewrite module configured to sequentially extract the image frames respectively from the frame group for left eye and the frame group for right eye stored in the frame storage module, and sequentially rewriting a display on a display screen to the extracted image frames; and a display invalidation module configured to invalidate the display on the display screen during a first period during which the display rewrite module rewrites the image frame for left eye to the image frame for right eye, and during a second period during which the display rewrite module rewrites the image frame for right eye to the image frame for left eye.

More specifically, the display screen is in the non-display state during the period of rewriting the image frame for left eye to the image frame for right eye and during the period of rewriting the image frame for right eye to the image frame for left eye. In other words, the display screen is selectively brought to the display state only during the period of rewriting the image frame for left eye to the subsequent image frame for left eye and during the period of rewriting the image frame for right eye to the subsequent image frame for right eye.

Accordingly, even in the transition period of rewriting the display screen, display of the image frame for left eye and the image frame for right eye in a mixed manner is avoided, thereby making it possible to appropriately display the three-dimensional video. Further, a television receiving apparatus including such a frame processing device can be constructed.

Further, a frame processing method according to an aspect of the present invention includes: sequentially extracting image frames for left eye and image frames for right eye from a three-dimensional video signal containing a video signal for left eye and a video signal for right eye; alternately generating a frame group for left eye in which a plurality of image frames for left eye are arranged and a frame group for right eye in which a plurality of image frames for right eye are arranged, based on the sequentially extracted image frames for left eye and for right eye; sequentially storing the alternately generated frame group for left eye and frame group for right eye; sequentially extracting the image frames respectively from the frame group for left eye and the frame group for right eye stored in the frame storage module, and sequentially rewriting a display on a display screen to the extracted image frames; and invalidating the display on the display screen during a first period of rewriting the image frame for left eye to the image frame for right eye, and during a second period of rewriting the image frame for right eye to the image frame for left eye.

DETAILED DESCRIPTION OF THE INVENTION

Figure 1:
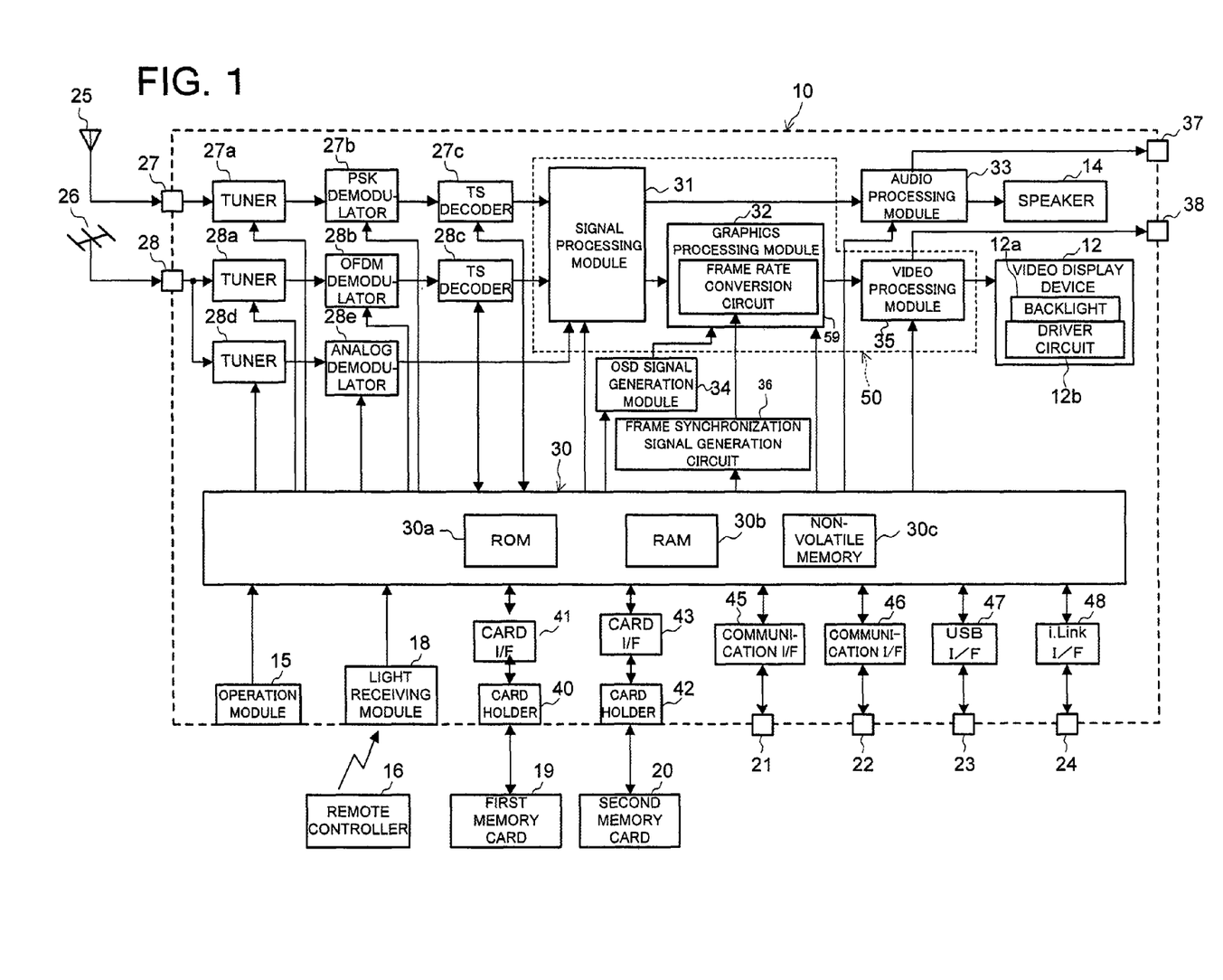
FIG. 1 is a functional block diagram illustrating a configuration of a television receiving apparatus including a frame processing module according to an embodiment of the present invention.

Hereinafter, embodiments for carrying out the present invention will be described with reference to the drawings. FIG. 1 is a functional block diagram illustrating a configuration of a television receiving apparatus 10 including a frame processing module (frame processing device) 50 according to an embodiment of the present invention.

The television receiving apparatus 10 of this embodiment is a digital television broadcast receiving apparatus as illustrated in FIG. 1. This television receiving apparatus (hereinafter, described as a "DTV apparatus") 10 has, for example, a flat panel-type video display device 12 such as, for example, an SED (Surface-conduction Electron-emitter Display) display panel or a liquid crystal display panel, a speaker 14, an operation module 15, and a light receiving module 18 receiving operation information transmitted from a remote controller 16, which are provided in a cabinet. The video display device 12 is a display device of a type having a display element which receives supply of light from a light source to perform display, and includes a backlight 12a and a driver circuit 12b driving the backlight 12a.

Further, the DTV apparatus 10 is configured such that a first memory card 19, for example, an SD (Secure Digital) memory card, an MMC (Multimedia Card) and a memory stick can be attached thereto and detached therefrom so that recording and reproduction of information such as programs and photographs is performed to/from the first memory card 19. Furthermore, the DTV apparatus 10 is configured such that a second memory card (IC card) 20 on which, for example, contract information and the like are recorded can be attached thereto and detached therefrom so that recording and reproduction of information is performed to/from the second memory card 20.

Moreover, the DTV apparatus 10 includes a first LAN (Local Area Network) terminal 21, a second LAN terminal 22, a USB (Universal Serial Bus) terminal 23 and an i.LINK® terminal 24. Among them, the first LAN terminal 21 is used as a LAN compatible HDD (Hard Disk Drive) dedicated port. More specifically, the first LAN terminal 21 is used to record and reproduce information by Ethernet® to/from the LAN compatible HDD that is a NAS (Network Attached Storage) connected thereto.

By providing the first LAN terminal 21 as the LAN compatible HDD dedicated port as described above, recording of program information with high-vision image quality can be stably performed on the HDD independent of other network environments and network usage. Further, the second LAN terminal 22 is used as a general LAN compatible port using Ethernet®, and is connected with devices such as a LAN compatible HDD, a DVD (Digital Versatile Disk) recorder built in a PC (Personal Computer) HDD and the like via, for example, a hub and used for transmitting information to/from such devices.

Note that the above-described PC has a function for operating as a server device of contents in a home network, and can be used as a UPnP (Universal Plug and Play) compatible device having a service of providing URI (Uniform Resource Identifier) information necessary for access to the contents. Further, since digital information communicated via the second LAN terminal 22 in the above-described DVD recorder is only for a control system, it is necessary to provide a dedicated analog transmission path in order to transit analog video and audio information to/from the DTV apparatus 10. Furthermore, the second LAN terminal 22 enables connection to the Internet (network) via a router (broadband router) or the like connected to the hub.

The USB terminal 23 is used as a general USB compatible port and connected with USB devices such as a cellular phone, a digital camera, a card reader/writer for a memory card, an HDD, a keyboard and the like, for example, via the hub and used to transmit information to/from the USB devices. The i.LINK® terminal 24 is serially connected with, for example, an AV-HDD, a D (Digital)-VHS (Video Home System) and the like, and used to transmit information to/from these devices.

Here, the DTV apparatus 10 of this embodiment can receive the digital television broadcast (two-dimensional video broadcast) and three-dimensional video broadcast (digital three-dimensional broadcast) which will be described later in detail, for BS/CS/terrestrial digital broadcasts. Further, the DTV apparatus 10 receives broadcast wave in which two-dimensional or three-dimensional video data and audio data (and text information) are multiplexed, via antennas 25 and 26 as illustrated in FIG. 1.

Specifically, as illustrated in FIG. 1, a satellite digital television broadcast signal received by the antenna 25 for receiving BS/CS digital broadcast is supplied to a tuner 27a for the satellite digital broadcast via an input terminal 27 in the DTV apparatus 10. The tuner 27a selects a broadcast signal of a desired channel by a control signal from a controller 30 and outputs the selected broadcast signal to a PSK (Phase Shift Keying) demodulator 27b.

The PSK demodulator 27b demodulates the broadcast signal selected in the tuner 27a by the control signal from the controller 30 to obtain a transport stream containing the desired program, and outputs it to a TS decoder 27c. The TS decoder 27c performs TS decoding processing of the signal multiplexed by the transport stream (TS) based on the control signal from the controller 30, and outputs a PES (Packetized Elementary Stream) obtained by depacketing the digital video signal and audio signal of the desired program to an STD buffering signal processing module 31. Further, the TS decoder 27c outputs section information sent by the digital broadcast to the signal processing module 31.

On the other hand, the terrestrial digital television broadcast signal received by the antenna 26 for receiving the terrestrial broadcast is supplied to a tuner 28a for the terrestrial digital broadcast via an input terminal 28. The tuner 28a selects a broadcast signal of a desired channel by a control signal from the controller 30, and outputs the selected broadcast signal to an OFDM (Orthogonal Frequency Division Multiplexing) demodulator 28b. The OFDM demodulator 28b demodulates the broadcast signal selected in the tuner 28a by the control signal from the controller 30 to obtain a transport stream containing the desired program, and outputs it to a TS decoder 28c.

The TS decoder 28c performs TS decoding processing of the signal multiplexed by the transport stream (TS) based on the control signal from the controller 30, and outputs a PES obtained by depacketing the digital video signal and audio signal of the desired program to the STD buffer in the signal processing module 31. Further, the TS decoder 28c outputs section information sent by the digital broadcast to the signal processing module 31. Further, an analog demodulator 28e demodulates an analog broadcast signal selected in a tuner 28d, and outputs it to the signal processing module 31. Furthermore, the PSK demodulator 27b or the OFDM demodulator 28b demodulates the broadcast wave of the three-dimensional video selected by the tuner 27a or the tuner 28a. Moreover, the TS decoder 27c or the TS decoder 28c decodes the demodulated stream of the three-dimensional video and outputs it to the signal processing module 31.

Here, at the television viewing, the above-described signal processing module 31 selectively performs predetermined digital signal processing on the digital video signal and audio signal individually supplied from the TS decoder 27c and the TS decoder 28c, and outputs them to a graphics processing module 32 and an audio processing module 33. Further, when reproducing contents other than the television broadcast, the signal processing module 31 selects a reproduction signal of contents inputted from the controller 30, performs predetermined digital signal processing on it, and outputs it to the graphics processing module 32 and the audio processing module 33.

Further, the signal processing module 31 outputs to the controller 30 various kinds of data and electronic program guide (EPG) information for obtaining a program, program attribute information (program category and the like), closed caption information (service information, S1, or PSI) from among the section information inputted from the TS decoder 27c (28c). The controller 30 including a ROM 30a, a RAM 30b, a non-volatile memory 30c and so on performs image generation processing to display an EPG and a closed caption from the inputted information, and outputs the generated image information to the graphics processing module 32.

The graphics processing module 32 includes a frame rate conversion circuit 59 described later in detail. Further, the DTV apparatus 10 of this embodiment includes a frame synchronization signal generation circuit 36 which gives a timing when the frame rate conversion circuit 59 generates an image frame. The graphics processing module 32 synthesizes a digital video signal supplied from the AV decoder in the signal processing module 31, an OSD signal generated in an OSD (On Screen Display) signal generation module 34, image data by a data broadcast, an EPG generated by the controller 30, and a closed caption signal, and outputs the resulting signal to a video processing module 35. Further, when displaying a closed caption by a closed caption broadcast, the graphics processing module 32 superimposes closed caption information on the video signal based on the control from the controller 30.

The digital video signal outputted from the graphics processing module 32 is supplied to the video processing module 35. The video processing module 35 converts the inputted digital video signal to an analog video signal in a format displayable on the video display device 12. The video processing module 35 then outputs the analog video signal to the video display device 12 to cause the video display device 12 to display video, and derives it to the outside via a video output terminal 38. Further, the audio processing module 33 converts the inputted digital audio signal to an analog audio signal in a format reproducible by the speaker 14. The audio processing module 33 then outputs the analog audio signal to the speaker 14 to cause the speaker 14 to reproduce audio, and derives it to the outside via an audio output terminal 37.

Here, all of the operations of the DTV apparatus 10 including the above-described various kinds of receiving operations are comprehensively controlled by the controller 30. The controller 30 has a CPU (Central Processing Unit) and so on built therein. The controller 30 receives operation information from the operation module 15, or receives operation information sent from the remote controller 16 via the light receiving module 18. Further, the controller 30 controls the modules so that contents of the received operation information are reflected. The controller 30 mainly uses the ROM (Read Only Memory) 30a storing a control program executed by the CPU, the RAM (Random Access Memory) 30b providing a work area to the CPU, and the non-volatile memory 30c in which various kinds of setting information and control information are stored.

Further, the controller 30 is connected to a card holder 40 to which the first memory card 19 can be attached via a card I/F (Interface) 41. Thus, the controller 30 can transmit information to/from the first memory card 19 attached to the card holder 40 via the card I/F 41. Further, the controller 30 is connected to a card holder 42 to which the second memory card 20 can be attached via a card I/F 43. Thus, the controller 30 can transmit information to/from the second memory card 20 attached to the card holder 42 via the card I/F 43.

Figure 3:
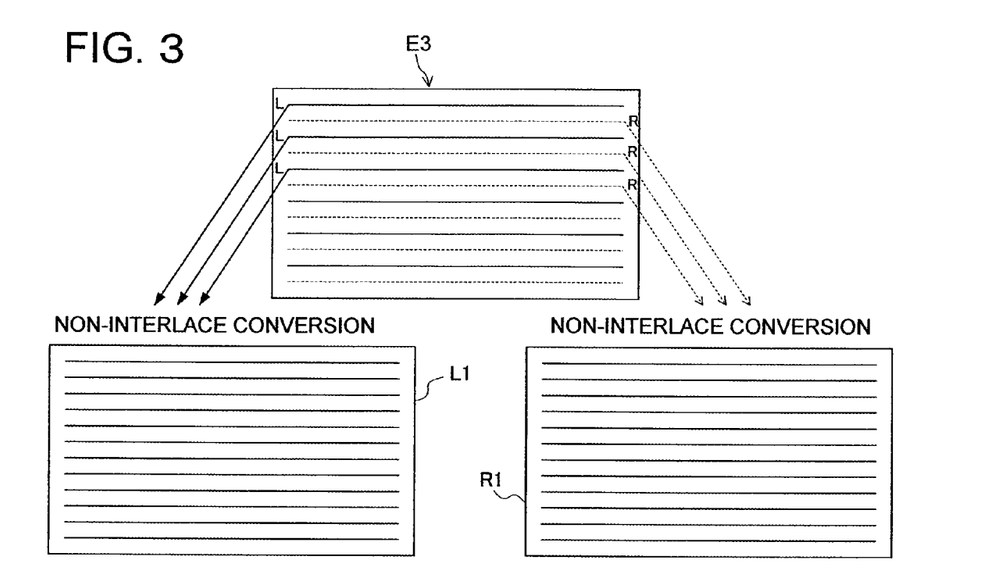
FIG. 3 is a view schematically illustrating non-interlace conversion processing by a left/right image separation circuit included in the frame processing module in FIG. 2.

Further, the controller 30 is connected to the first LAN terminal 21 via a communication I/F 45. Thus, the controller 30 can transmit information to/from the LAN compatible HDD 25 connected to the first LAN terminal 21 via the communication I/F 45. In this case, the controller 30 has a DHCP (Dynamic Host Configuration Protocol) server function, and conducts control by assigning an IP (International Protocol) address to the LAN compatible HDD 25 connected to the first LAN terminal 21. Further, the controller 30 is connected to the second LAN terminal 22 via a communication I/F 46. Thus, the controller 30, as illustrated in FIG. 3, can transmit information to the devices connected to the second LAN terminal 22 via the communication I/F 46.

Further, the controller 30 is connected to the USB terminal 23 via a USB I/F 47. Thus, the controller 30 transmits information to/from the devices connected to the USB terminal 23 via the USB I/F 47. Further, the controller 30 is connected to the i.LINK® terminal 24 via an i.LINK® I/F 48. Thus, the controller 30 can transmit information to/from the devices connected to the i.LINK® terminal 24 via the i.LINK® I/F 48.

Figure 2:
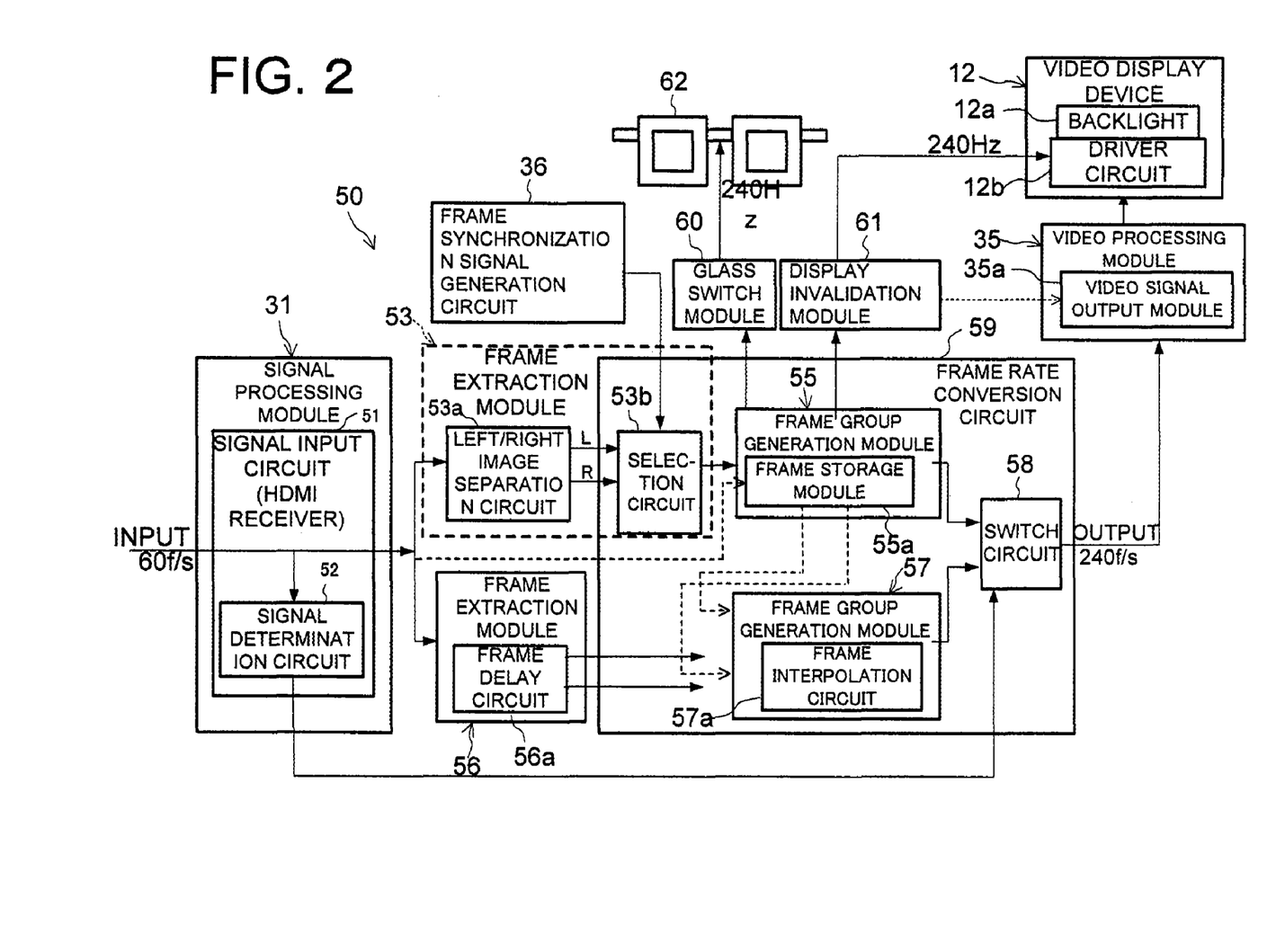
FIG. 2 is a functional block diagram illustrating a configuration of the frame processing module in FIG. 1.
Figure 4:
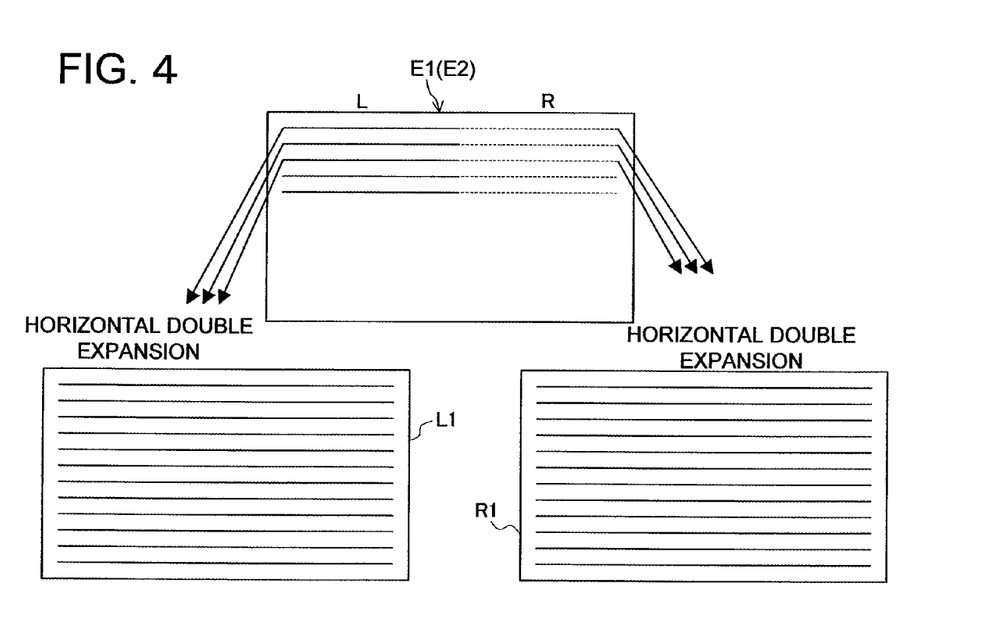
FIG. 4 is a view schematically illustrating horizontal double expansion processing by the left/right image separation circuit included in the frame processing module in FIG. 2.
Figure 5:
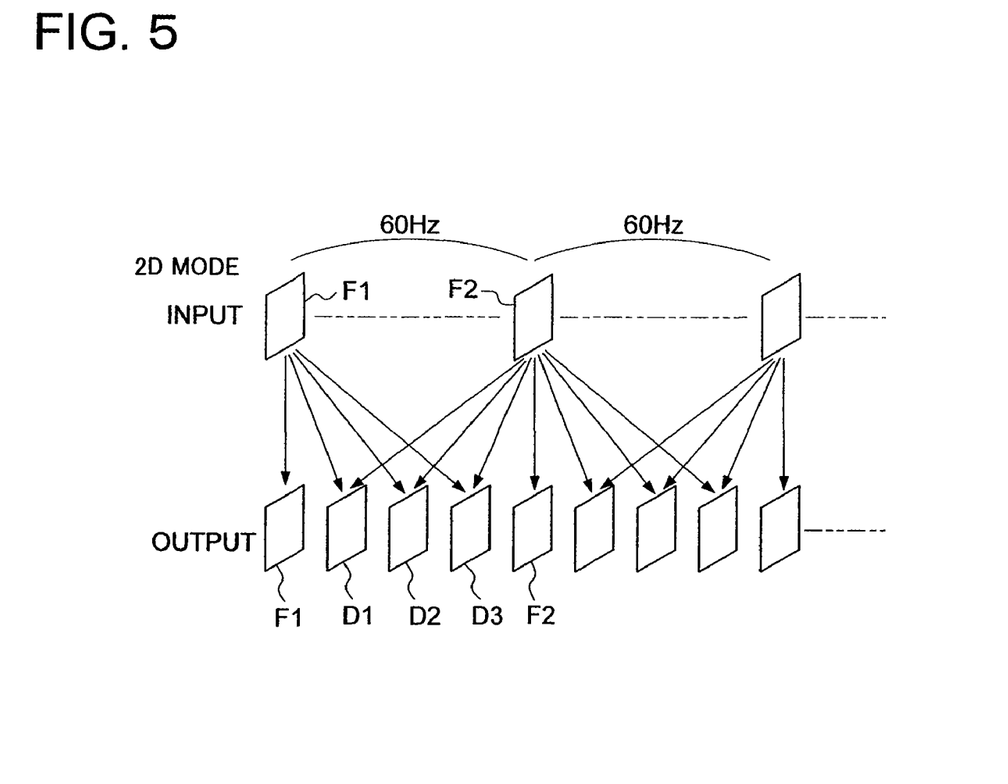
FIG. 5 is a view schematically illustrating generation processing of an interpolation frame by a frame interpolation circuit included in the frame processing module in FIG. 2.
Figure 6:
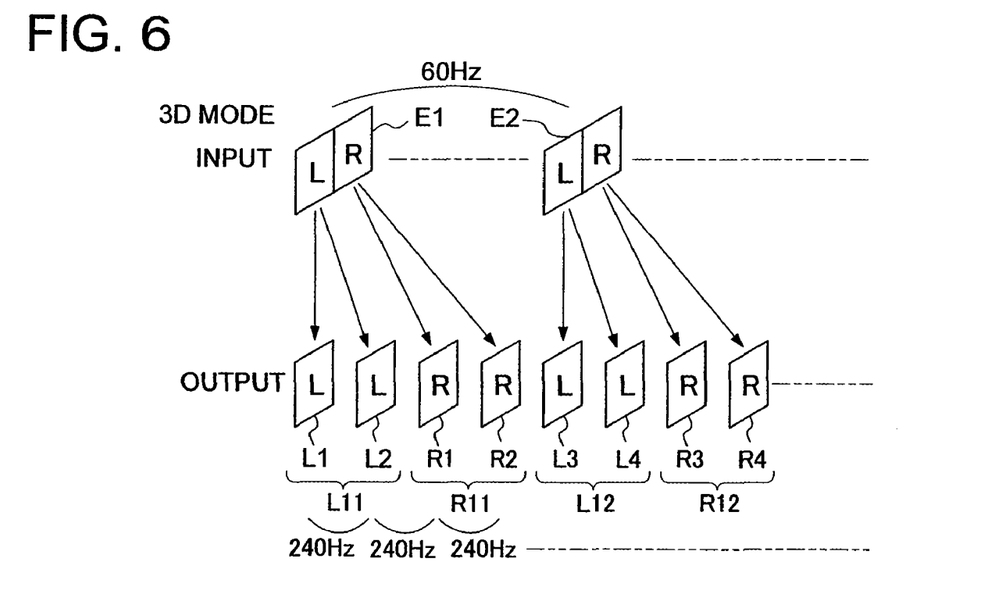
FIG. 6 is a view schematically illustrating generation processing of frame groups for left eye and for right eye by a frame group generation module included in the frame processing module in FIG. 2.
Figure 7:
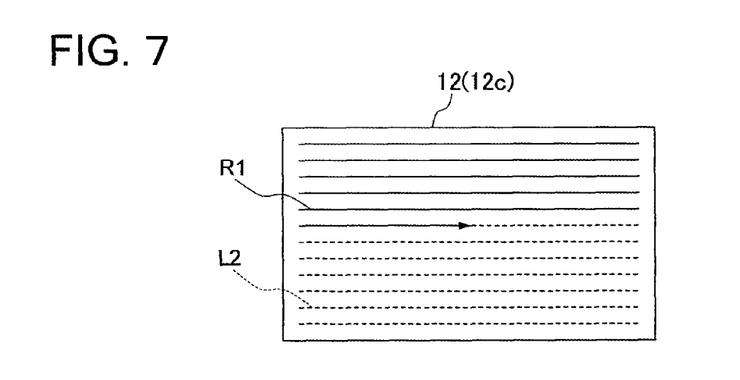
FIG. 7 is a view illustrating a transitional state of an image frame for left eye displayed on a display screen of the television receiving apparatus in FIG. 1 being written to an image frame for right eye.
Figure 8:
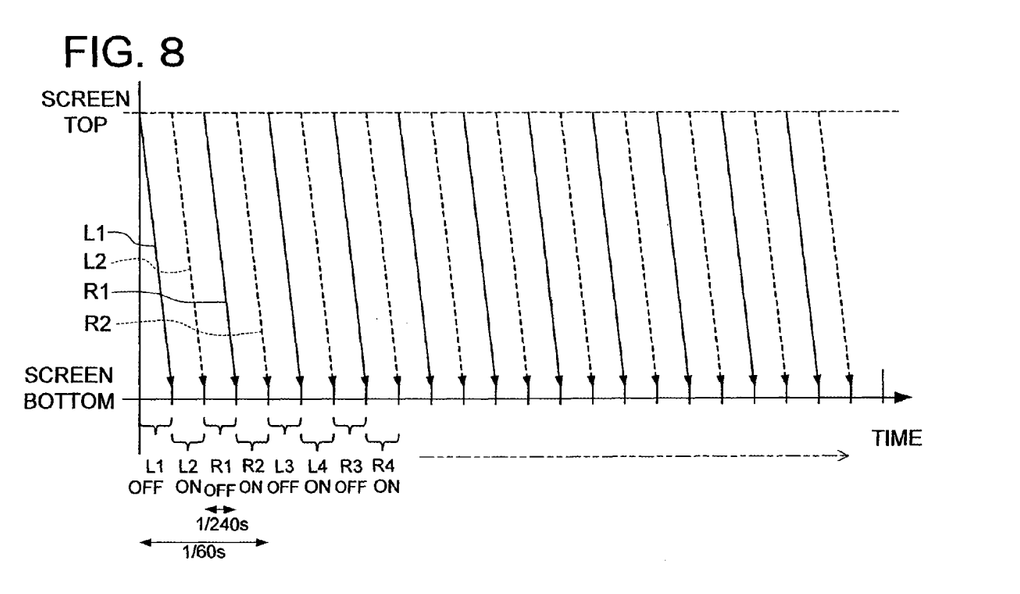
FIG. 8 is a view illustrating control on a backlight of a video display device by a display invalidation module included in the frame processing module in FIG. 2.

Next, a configuration of the frame processing module 50 according to this embodiment will be described based on FIG. 2 to FIG. 8 in addition to the above-described FIG. 1. Here, FIG. 2 is a functional block diagram illustrating the configuration of the frame processing module 50. Further, FIG. 3 is a view schematically illustrating non-interlace conversion processing by a left/right image separation circuit 53a of a frame extraction module 53. Further, FIG. 4 is a view schematically illustrating horizontal double expansion processing by the left/right image separation circuit 53a. FIG. 5 is a view schematically illustrating generation processing of an interpolation frame by a frame interpolation circuit 57a of a frame group generation module 57. Further, FIG. 6 is a view schematically illustrating generation processing of frame groups for left eye and right eye by a frame group generation module 55. FIG. 7 is a view illustrating a transitional state of an image frame for left eye displayed on a display screen 12c being rewritten to an image frame for right eye. Further, FIG. 8 is a view illustrating control on the backlight 12a of the video display device 12 by a display invalidation module 61.

When the DTV apparatus 10 including the above-described frame processing module 50 receives the three-dimensional video broadcast, generally, the video display device 12 alternately displays the image for left eye and the image for right eye while switching them every 1/240 sec. In cooperation with this, a viewer wears three-dimensional video viewing glasses 62 illustrated in FIG. 2 which alternately switch between transmission and non-transmission of video for the right eye side and for the left eye side. As a result of this, the right and left eyes can view independent images (three-dimensional video).

More specifically, the frame processing module 50 includes, as illustrated in FIG. 2, a signal input circuit 51 having a signal determination circuit 52, the frame extraction module 53 having the left/right image separation circuit 53a and a selection circuit 53b, a frame extraction module 56 having a frame delay circuit 56a, the frame group generation module 55 having a frame storage module 55a, the frame group generation module 57 having the frame interpolation circuit 57a, a switch circuit 58, the video processing module 35 having a video signal output module 35a, and the display invalidation module 61. Further, in the frame processing module 50, a glass switch module 60 connected to the above-described three-dimensional video viewing glasses 62 and so on are provided. Further, a frame synchronization signal generated by the frame synchronization signal generation circuit 36 is inputted into the frame rate conversion circuit 59 of the frame processing module 50.

The signal input circuit 51 functioning as a signal input module determines the kind of the inputted video signal, that is, whether the inputted video signal is the three-dimensional video signal made by multiplexing the video signal for left eye and the video signal for right eye or an ordinary two-dimensional video signal representing two-dimensional video. Here, the input interface of the signal input circuit 51 having the signal determination circuit 52 is composed of an HDMI (High-Definition Multimedia Interface) receiver. Thus, the signal determination circuit 52 can extract the kind of the inputted video signal in authentication of connection to thereby obtain the format of the inputted video signal. Further, the signal determination circuit 52 can determine the kind of the video signal based on the information described in the header of the data stream obtained by the TS decoder 27c or the TS decoder 28c.

Here, there are various encoding modes for the case of the three-dimensional video signal. For example, as illustrated in FIG. 3, there is an image frame E3 in which image data L for left eye and image data R for right eye are alternately multiplexed every other scanning line. Further, as illustrated in FIG. 4, there are an image frame E1 (E2) and the like having the image data L for left eye in a left half of one image frame and the image data R for right eye in a right half. The signal in such an encoding mode can be recognized to be the three-dimensional video signal through the authentication of connection, the header information or the like.

When the signal determination circuit 52 determines that a two-dimensional video signal has been inputted by the signal input circuit 51, the frame extraction module (second frame extraction module) 56 sequentially extracts image frames F1, F2, and so on for the two-dimensional video from the inputted two-dimensional video signal as illustrated in FIG. 5. The frame delay circuit 56a acquires, as illustrated in FIG. 5, the image frame F2 one frame after the target image frame F1, and sends the current image frame F1 and the delayed image frame F2 to the frame interpolation circuit 57a of the frame group generation module (second frame group generation module) 57 as illustrated in FIG. 2. Further, instead of this, (as illustrated by a broken line with an arrow in FIG. 2), the above-described current image frame F1 and the delayed image frame F2 may be acquired by the frame storage module 55a in the frame group generation module 55, and the image frames F1 and F2 may be sent from the frame storage module 55a to the frame group generation module 57 side. Thus, the storage area in the frame storage module 55a included in the frame group generation module 55 can be effectively utilized (shared).

The frame interpolation circuit 57a of the frame group generation module 57 generates, as illustrated in FIG. 5, an interpolation frame D2 corresponding to the successive image frames F1 and F2 adjacent to each other among a plurality of image frames F1, F2 and so on for two-dimensional video sequentially extracted by the frame extraction module 56. The interpolation frame D2 corresponds to an intermediate transitional moving image predicted from the relation between the image frames F1 and F2 (predicted, for example, based on the result of movement detection). Further, the frame interpolation circuit 57a generates, as illustrated in FIG. 5, an interpolation frame D1 based on the image frame F1 and the generated interpolation frame D2. Further, the frame interpolation circuit 57a generates, as illustrated in FIG. 5, an interpolation frame D3 based on the interpolation frame D2 and the image frame F2. In this manner, even a two-dimensional moving image with rapid movement such as sports can be displayed in a good condition by increasing the number of image frames.

When the signal determination circuit 52 determines that a two-dimensional video signal has been inputted by the signal input circuit 51, the switch circuit 58 selects the output from the frame group generation module 57 having the frame interpolation circuit 57a as illustrated in FIG. 2. Further, when the signal determination circuit 52 determines that a three-dimensional video signal has been inputted by the signal input circuit 51, the switch circuit 58 selects the output from the frame group generation module 55. Furthermore, the operation of the display invalidation module 61 is turned on/off (executed/stopped) according to the output from the signal determination circuit 52. More specifically, when the signal determination circuit 52 determines the input of the three-dimensional video signal, the operation of the display invalidation module 61 is controlled into an execution state, whereas when the signal determination circuit 52 determines the input of the two-dimensional video signal, the operation of the display invalidation module 61 is controlled into a stop state.

The frame extraction module 53 sequentially extracts, as illustrated in FIG. 6, image frames L1, L2, L3, L4 and so on for left eye and image frames R1, R2, R3, R4 and so on for right eye from the three-dimensional video signal in which the video signal for left eye and the video signal for right eye are multiplexed, that is, multiplexed image frames E1 and E2. The left/right image separation circuit 53a of the frame extraction module 53 extracts the image frame for left eye and the image frame for right eye independently using 1/60 seconds and stores the image frames in the work memory for temporarily storing frames.

A case in which the three-dimensional video signal is composed of the image frame E3 exemplified in FIG. 3 will be discussed. The frame extraction module 53 controls the left/right image separation circuit 53a and acquires the synchronization signal, for example, at 60 Hz generated by the frame synchronization signal generation circuit 36 into the selection circuit 53b. The frame extraction module 53 then performs interlace/progressive (non-interlace) conversion as illustrated in FIG. 3. As a result of this, the image frame L1 for left eye and the image frame R1 for right eye are extracted.

A case in which the three-dimensional video signal is composed of an image frame E1 (E2) exemplified in FIG. 4 will be discussed. In this case, the frame extraction module 53 controls, as in the above case, the left/right image separation circuit 53a and the selection circuit 53b and acquires the synchronization signal at 60 Hz from the frame synchronization signal generation circuit 36. The frame extraction module 53 then extracts, as illustrated in FIG. 4, the image data L on the left side and the image data R on the right side and performs horizontal double expansion processing to expand to double the image data L and R in the horizontal direction. As a result of this, the image frame L1 for left eye and the image frame R1 for right eye are extracted.

The frame group generation module 55 alternately generates, as illustrated in FIG. 6, a frame group L11 (L12) for left eye in which a plurality of image frames L1 and L2 (L3 and L4) for left eye are arranged and a frame group R11 (R12) for right eye in which a plurality of image frames R1 and R2 (R3 and R4) for right eye are arranged, based on the image frames for left eye and for right eye sequentially extracted by the frame extraction module 53. Specifically, the frame group generation module 55 individually copies, for example, the image frames L1 and R1 for left eye and for right eye extracted by the frame extraction module 53 and generates the interpolation frames L2 and R2 respectively. Further, the frame group generation module 55 arranges the interpolation frames L2 and R2 and the original image frames L1 and R1 to generate the frame group L11 for left eye and the frame group R11 for right eye. Thus, individual image frames are sequentially generated at a frame rate of 1/240 (f/s) that is four times 1/60 (f/s). The frame storage module 55a sequentially stores the frame group L11 (L12) for left eye and the frame group R11 (R12) for right eye which are alternately generated by the frame group generation module 55.

Here, the three-dimensional video viewing glasses 62 have a so-called liquid crystal shutter or the like which alternately switches between transmission and non-transmission of video on the left eye side and the right eye side. The three-dimensional video viewing glasses 62 switch between transmission and non-transmission on the left eye side and the right eye side every 1/240 sec in a manner to synchronize with the timing of starting rewrite of the image frames for left eye and for right eye on the display screen 12c.

The video processing module 35 includes the video signal output module 35a. The video signal output module 35a outputs a video signal corresponding to the image frame extracted from the frame storage module 55a to the video display device 12 side having the display screen 12c. This makes it possible to drive display pixels of the video display device 12 by the video signal to update the display image. In other words, the video processing module 35 functioning as a display rewrite module extracts image frames one by one in the storage order from the frame group L11 (L12) for left eye and the frame group R11 (R12) for right eye stored in the frame storage module 55a. The video processing module 35 then rewrites the display on the display screen to the extracted image frames in sequence (the order of the image frames L1, L2, R1, R2, L3, L4, R3, R4 and so on).

More specifically, as illustrated in FIG. 7 and FIG. 8, the video processing module 35 sequentially updates the display image from top to bottom of the display screen 12c. For example, the image frame R1 for right eye is written from top to bottom. During the period of 1/240 sec, the image frame L2 for left eye which has been displayed before is sequentially rewritten to the image frame R1 for right eye from the top (updated). The period of 1/240 sec is the period during which the image frame L2 for left eye and the image frame R1 for right eye are displayed in a mixed manner.

Here, as illustrated in FIG. 1 and FIG. 2, the display invalidation module 61 invalidates the display on the display screen 12c during a first period during which the video processing module 35 functioning as the display rewrite module configured to rewrite the image frame L1 (L4) for left eye to the image frame R1 (R3) for right eye and a second period during which the video processing module 35 rewrites the image frame R2 for right eye to the image frame L3 for left eye. Specifically, as illustrated in FIG. 1 and FIG. 2, the display invalidation module 61 controls the driver circuit 12b to stop the light emission of the backlight 12a during the first and second periods. Further, instead of this, the display invalidation module 61 causes the video signal output module 35a to output, for example, a video signal to bring the display screen 12c into the non-display state (for example, a video signal with a luminance component of 0) during the first and second periods.

In other words, the display invalidation module 61 brings the display screen 12c into the non-display state during the periods of rewriting the image frame for left eye to that for right eye and the image frame for right eye to that for left eye. On the other hand, the display invalidation module 61 selectively brings the display screen 12c into the display state only during the period during which the image frame for left eye (for right eye) is being rewritten to the subsequent image frame for left eye (for right eye). This can prevent video without appearance of solidity from being displayed.

Next, processing by the frame processing module 50 configured as described above will be described based on a flowchart illustrated in FIG. 9.

Figure 9:
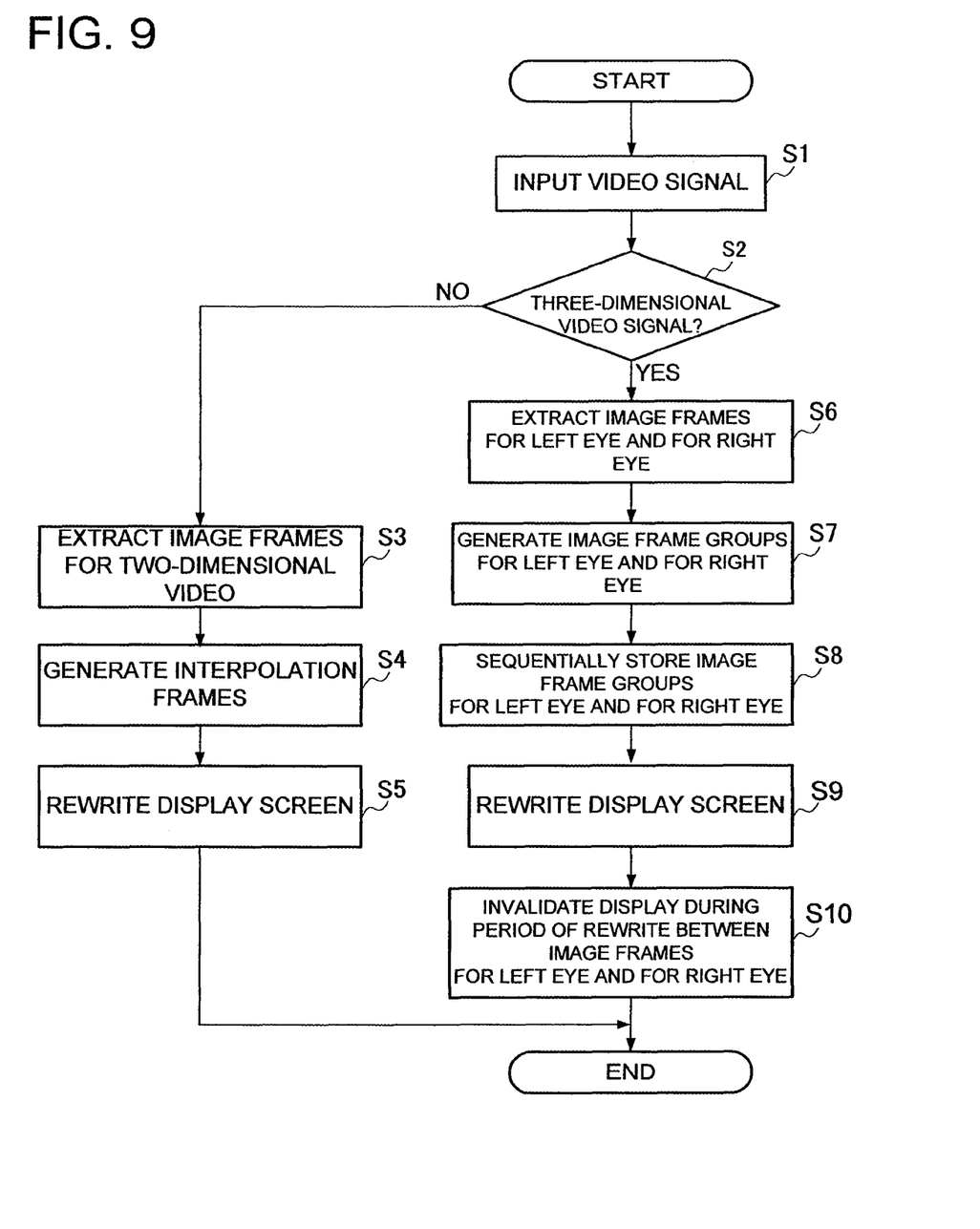
FIG. 9 is a flowchart illustrating processing by the frame processing module in FIG. 2.

As illustrated in FIG. 9, first, when the signal input circuit 51 inputs a video signal thereinto (S1), the signal determination circuit 52 determines whether the inputted video signal is a three-dimensional video signal or a two-dimensional video signal (S2). When the inputted video signal is not a three-dimensional video signal (NO at S2) but a two-dimensional video signal, the frame extraction module 56 sequentially extracts, as illustrated in FIG. 5, the image frames F1, F2 and so on for two-dimensional video (S3). Then, the frame interpolation circuit 57a of the frame group generation module 57 generates interpolation frames D1 to D3 predicted from the relation between the successive image frames F1 and F2 (S4). Subsequently, the video processing module 35 outputs a video signal corresponding to each of the image frames from the video signal output module 35a to sequentially rewrite the display screen 12c to the image frame for the two-dimensional video containing the interpolation frames (S5).

On the other hand, when the video signal inputted into the signal input circuit 51 is a three-dimensional video signal (YES at S2), the frame extraction module 56 sequentially extracts, as illustrated in FIG. 6, the image frames L1 and L3 for left eye and the image frames R1 and R3 for right eye (S6). Subsequently, the frame group generation module 55 alternately generates the frame group L11 (L12) for left eye in which a plurality of image frames L1 and L2 (L3 and L4) for left eye are arranged and the frame group R11 (R12) for right eye in which a plurality of image frames R1 and R2 (R3 and R4) for right eye are arranged, based on the sequentially extracted image frames for left eye and for right eye (S7).

Subsequently, the frame storage module 55a sequentially stores the frame group L11 (L12) for left eye and the frame group R11 (R12) for right eye alternately generated by the frame group generation module 55 (S8). Subsequently, the video processing module 35 sequentially extracts the image frames one by one from the frame groups for left eye and for right eye, and outputs a video signal corresponding to the extracted image frame from the video signal output module 35a to sequentially rewrite the display screen 12c (S9). Further, the display invalidation module 61 invalidates the display on the display screen 12c, for example, by turning off the backlight 12a during the periods of rewriting the image frame for left eye to that for right eye and the image frame for right eye to that for left eye (S10).

As has been described, the DTV apparatus 10 including the frame processing module 50 according to this embodiment brings the display screen 12c into the non-display state during the period during which the image frame for left eye is being rewritten to the image frame for right eye and during the period during which the image frame for right eye is being rewritten to the image frame for left eye. In other words, the DTV apparatus 10 selectively brings the display screen 12c into the display state only during the period during which the image frame for left eye is being rewritten to the subsequent image frame for left eye and during the period during which the image frame for right eye is rewritten to the subsequent image frame for right eye. Accordingly, with the DTV apparatus 10, even in the transition period of rewriting the display screen, display of the image frame for left eye and the image frame for right eye in a mixed manner is avoided, thereby making it possible to appropriately display three-dimensional video. Further, in the DTV apparatus 10 of this embodiment, the number of frames of moving image is increased by generation of interpolation frames in the two-dimensional video, thus allowing a viewer to view an image with less afterimage effect.

(Other Embodiments)

Figure 10:
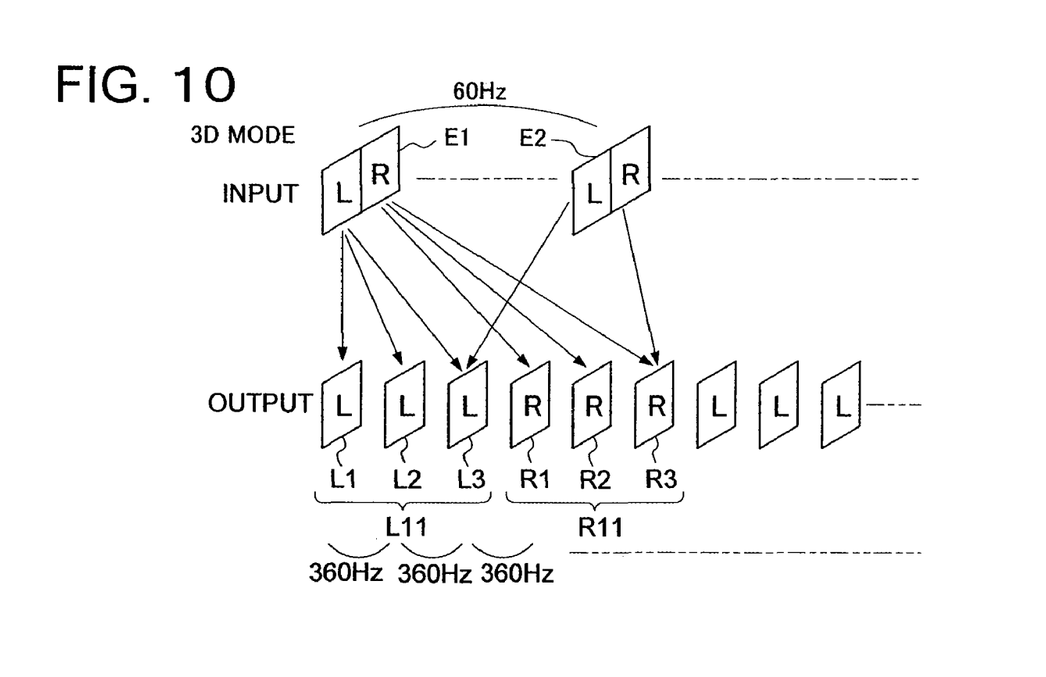
FIG. 10 is a view schematically illustrating generation processing of frame groups for left eye and for right eye by the frame group generation module different from that in FIG. 6.

Embodiments of the present invention are not limited to the above-describe embodiment, but can be extended or changed, and the extended and changed embodiments are also included in the technical scope of the present invention. For example, an example in which output is performed at a frequency four times the original frame frequency has been illustrated in the above-described embodiment. In contrast, the frequency may be n times (multiple times) such as 6 times, 8 times, 10 times, 12 times or the like as illustrated in FIG. 10. In the case of the three-dimensional video, the same image is outputted n/2 times. In the case of the two-dimensional video, (n−1) interpolation frames are generated and outputted. Note that, as illustrated in FIG. 10, the interpolation frames L3 and R3 predicted from the relation between the successive image frames may be generated even for the three-dimensional video.

What is claimed is:

1. A frame processing device, comprising:
a first frame extraction module configured to extract a first image frame from a first video signal and a second image frame from a second video signal from a three-dimensional video signal containing the first and the second video signals;
a second frame extraction module configured to sequentially extract a plurality of third image frames from a two-dimensional video signal containing the third image frames;
a frame storage module configured to store the first, the second, and the third image frames extracted by the first and the second frame extraction modules;
an inserting module configured to generate an interpolation frame from successive third image frames stored in the frame storage module and insert the interpolation frame between the successive third image frames to increase a display output frame frequency;
a display rewrite module configured to sequentially rewrite a display on a display screen with the extracted image frames by either: (1) alternating between a first procedure of rewriting the display with the first image frame stored in the frame storage module a plural number of times to increase the display output frame frequency, and a second procedure of rewriting the display with the second image frame stored in the frame storage module the plural number of times to increase the display output frame frequency, or (2) rewriting the display on the display screen with the third image frames and the interpolation frame; and
a display module configured to invalidate the display on the display screen during a first rewriting period in which the display rewrite module rewrites one of the first image frame and the second image frame with a different one of the first image frame and the second image frame, and configured to not invalidate the display on the display screen during a second rewriting period in which the display rewrite module rewrites one of the first image frame and the second image frame with the same one of the first image frame and the second image frame.

2. The frame processing device according to claim 1, wherein the display screen is a display screen of a display device having a light source and a display element performing display by receiving supply of light from the light source; and
wherein the display module comprises a display invalidation module configured to stop light emission of the light source during a first period in which the display rewrite module rewrites the first image frame with the second image frame and during a second period in which the display rewrite module rewrites the second image frame with the first image frame.

3. The frame processing device according to claim 1, further comprising:
a signal input module configured to be capable of inputting the two-dimensional video signal and the three-dimensional video signal thereinto; and
a signal determination module configured to determine whether the video signal inputted by the signal input module is the three-dimensional video signal or the two-dimensional video signal.

4. A television receiving apparatus, comprising:
a first frame extraction module configured to extract a first image frame from a first video signal and a second image frame from a second video signal from a three-dimensional video signal containing the first and the second video signals;
a second frame extraction module configured to sequentially extract a plurality of third image frames from a two-dimensional video signal containing the third image frames;
a frame storage module configured to store the first, the second, and the third image frames extracted by the first and the second frame extraction modules;
an inserting module configured to generate an interpolation frame from successive third image frames stored in the frame storage module and insert the interpolation frame between the successive third image frames to increase a display output frame frequency;
a display rewrite module configured to sequentially rewrite a display on a display screen by either: (1) alternating between a first procedure of rewriting the display with the first image frame stored in the frame storage module a plural number of times to increase the display output frame frequency, and a second procedure of rewriting the display with the second image frame stored in the frame storage module the plural number of times to increase the display output frame frequency, or (2)

rewriting the display on the display screen with the third image frames and the interpolation frame; and a display module configured to invalidate the display on the display screen during a first rewriting period in which the display rewrite module rewrites one of the first image frame and the second image frame with a different one of the first image frame and the second image frame, and configured to not invalidate the display on the display screen during a second rewriting period in which the display rewrite module rewrites one of the first image frame and the second image frame with the same one of the first image frame and the second image frame.

5. A frame processing method, comprising:

extracting a first image frame from a first video signal and a second image frame from a second video signal from a three-dimensional video signal containing the first and the second video signals;

sequentially extracting a plurality of third image frames from a two-dimensional video signal containing the third image frames;

storing the first, the second, and the third image frames extracted by the first and the second frame extraction modules;

generating an interpolation frame from successive third image frames stored in the frame storage module, and inserting the interpolation frame between the successive third image frames to increase a display output frame frequency;

sequentially rewriting a display on a display screen by either: (1) alternating between a first procedure of rewriting the display with the first image frame stored in the frame storage module a plural number of times to increase the display output frame frequency, and a second procedure of rewriting the display with the second image frame stored in the frame storage module the plural number of times to increase the display output frame frequency, or (2) rewriting the display on the display screen with the third image frames and the interpolation frame;

invalidating the display on the display screen during a first rewriting period in which the display rewrite module rewrites one of the first image frame and the second image frame with a different one of the first image frame and the second image frame; and not invalidating the display on the display screen during a second rewriting period in which the display rewrite module rewrites one of the first image frame and the second image frame with the same one of the first image frame and the second image frame.

6. The frame processing method according to claim 5, wherein the display screen is a display screen of a display device having a light source and a display element performing display by receiving supply of light from the light source, and wherein the invalidating the display comprises stopping light emission of the light source during a first period in which the display rewrite module rewrites the first image frame with the second image frame and during a second period in which the display rewrite module rewrites the second image frame with the first image frame.

7. The frame processing method according to claim 5, further comprising:

inputting the two-dimensional video signal and the three-dimensional video signal; and determining whether the inputted video signal is the three-dimensional video signal or the two-dimensional video signal.

8. A frame processing device, comprising:

a first frame extraction module configured to sequentially extract image frames for a left eye and image frames for a right eye from a three-dimensional video signal which includes a video signal for the left eye and a video signal for the right eye;

a first frame group generation module configured to alternately generate a frame group for the left eye in which a plurality of image frames for left eye are arranged and a frame group for the right eye in which a plurality of image frames for the right eye are arranged, based on the sequentially extracted image frames for the left eye and for the right eye;

a frame storage module configured to sequentially rewrite the frame group for the left eye and the frame group for the right eye;

a display rewrite module configured to sequentially read the frame group for the left eye and the frame group for the right eye stored in the frame storage module in an order of storing, and sequentially rewriting a display on a display screen with the frame groups;

a display module configured to display on the display screen during a first period in which the display rewrite module rewrites the image frame for the left eye with a next image frame for the left eye, and during a second period in which the display rewrite module rewrites the image frame for the right eye with a next image frame for the right eye;

a signal input module configured to be capable of inputting a two-dimensional video signal representing two-dimensional video and the three-dimensional video signal individually thereinto;

a signal determination module configured to determine whether the video signal inputted by the signal input module is the three-dimensional video signal or the two-dimensional video signal;

a second frame extraction module configured to sequentially extract image frames for two-dimensional video from the inputted two-dimensional video signal if the signal determination module determines that the video signal inputted by the signal input module is the two-dimensional video signal; and a second frame group generation module configured to generate an interpolation frame to increase frame frequencies, based on a relationship between successive image frames in the third image frames stored in the frame storage module, and to insert the interpolation frame between the successive image frames, wherein the frame storage module is configured to sequentially store the image frame for two-dimensional video sequentially extracted by the second frame extraction module, wherein the second frame group generation module is configured to generate the interpolation frame based on the image frame for two-dimensional video sequentially stored in the frame storage module, and wherein the display rewrite module is further configured to rewrite the display on the display screen with the image frames for the two-dimensional video, which are sequentially extracted from the two-dimensional video signal and are stored in the frame storage module, and the interpolation frame.

* * * * *